United States Patent [19]

Shimamoto et al.

[11] Patent Number: 5,218,591
[45] Date of Patent: Jun. 8, 1993

[54] OPTICAL DISK APPARATUS FOR SHAPING PITS RECORDED ON AN OPTICAL DISK

[75] Inventors: Masayoshi Shimamoto; Kunimaro Tanaka; Isao Watanabe; Osamu Ito, all of Amagasaki, Japan

[73] Assignee: Mitsubishi Denki Kabushiki Kaisha, Japan

[21] Appl. No.: 725,277

[22] Filed: Jul. 3, 1991

[30] Foreign Application Priority Data

Jul. 5, 1990 [JP] Japan .................. 2-180102

[51] Int. Cl.⁵ .................. G11B 7/00; G11B 20/10; H04N 5/76
[52] U.S. Cl. .................. 369/54; 369/59; 369/116
[58] Field of Search .......... 369/117, 116, 121, 48, 369/54, 50, 59, 100, 13, 47, 111; 360/114; 346/76 L, 108

[56] References Cited

U.S. PATENT DOCUMENTS

| | | | |
|---|---|---|---|
| 4,866,692 | 9/1989 | Saito et al. | 369/54 |
| 4,894,816 | 1/1990 | Sukeda et al. | 369/116 |
| 4,998,237 | 3/1991 | Osakabe et al. | 369/59 |
| 5,003,527 | 3/1991 | Matsumoto et al. | 369/100 |

FOREIGN PATENT DOCUMENTS 2-87328  3/1990  Japan .

OTHER PUBLICATIONS

"High-Density Magneto-Optic Disk Using Highly Controlled Pit-Edge Recording" Proc. Int. Symp. on Optical Memory, 1987, Japanese Journal of Applied Physics, vol. 26 (1987), Supplement 26-4, pp. 243-248.

Primary Examiner—W. R. Young
Assistant Examiner—Thang V. Tran
Attorney, Agent, or Firm—Wolf, Greenfield & Sacks

[57] ABSTRACT

In an optical disk apparatus for recording information in pits formed on an optical disk by projecting a light beam onto the optical disk and heating an area of the optical disk corresponding to the pulse pattern of the information, the pulse pattern of the information to be recorded is discriminated, and on the basis of the discriminated pulse pattern, the timing to start on and end the emission of the light beam from the light source to the optical disk is modified, or the number of emissions and the duration of each emission is controlled so that the pattern of the pits are corrected to the shapes that ensure accurate regeneration of the information.

12 Claims, 6 Drawing Sheets

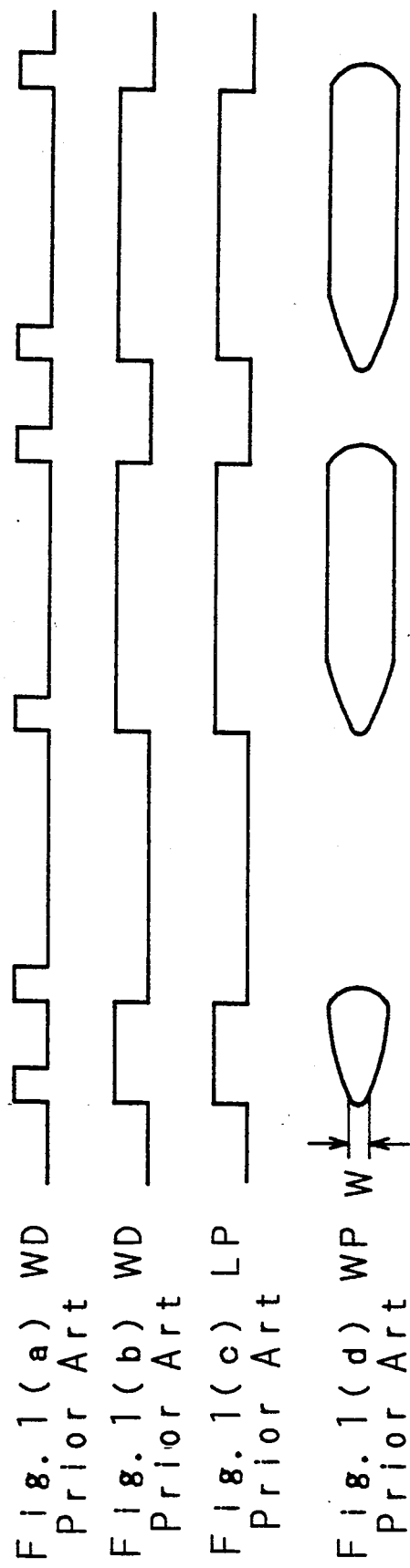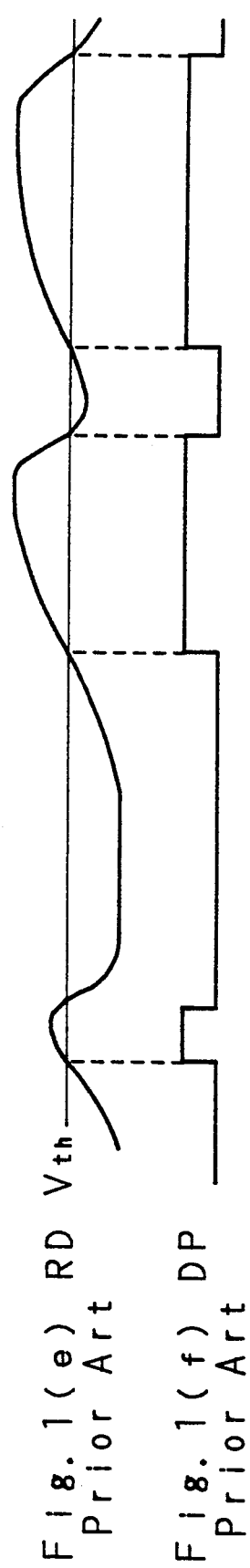
Fig. 1(a) WD Prior Art
Fig. 1(b) WD Prior Art
Fig. 1(c) LP Prior Art
Fig. 1(d) WP Prior Art
Fig. 1(e) RD Prior Art
Fig. 1(f) DP Prior Art

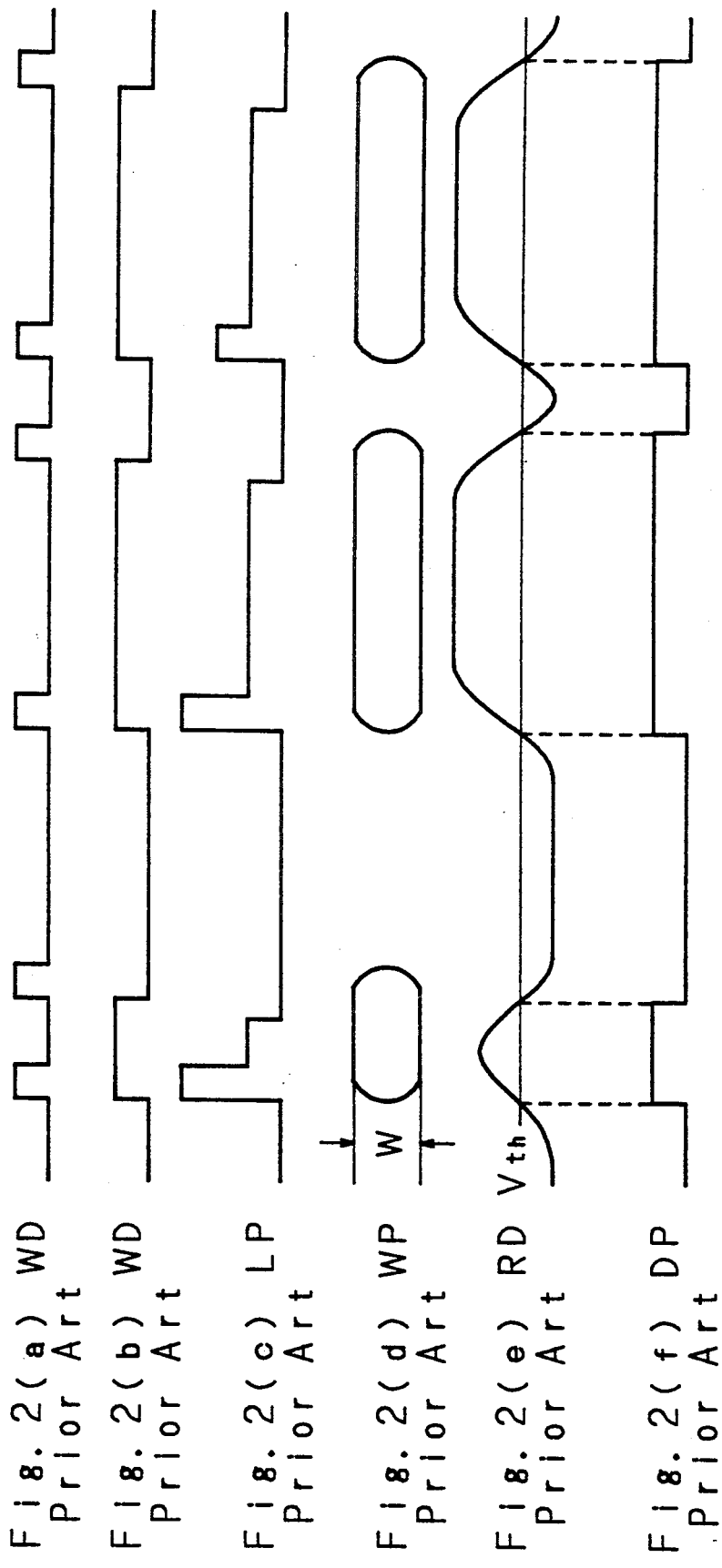
Fig. 2(a) WD Prior Art
Fig. 2(b) WD Prior Art
Fig. 2(c) LP Prior Art
Fig. 2(d) WP Prior Art
Fig. 2(e) RD $V_{th}$ Prior Art
Fig. 2(f) DP Prior Art

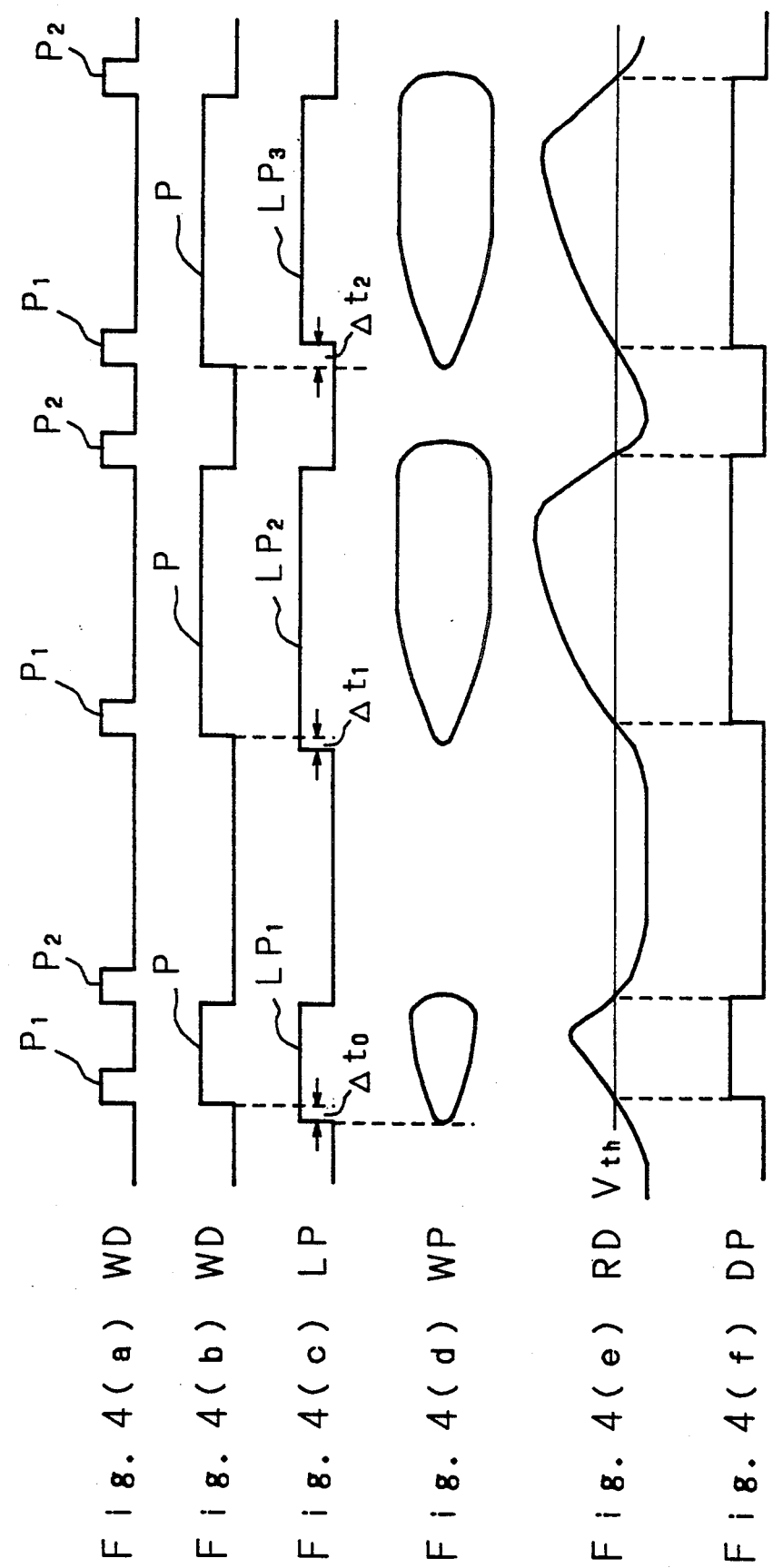

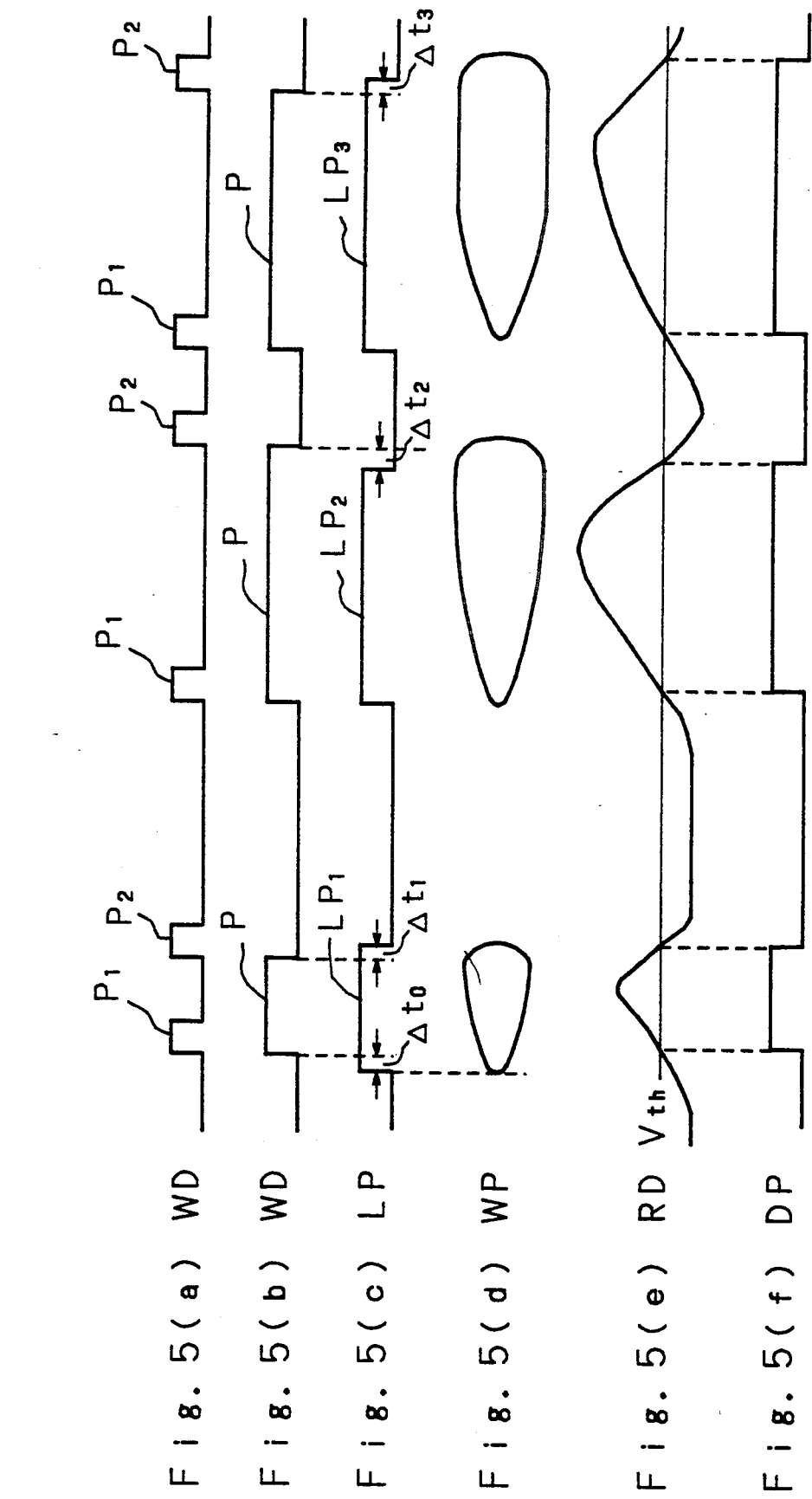

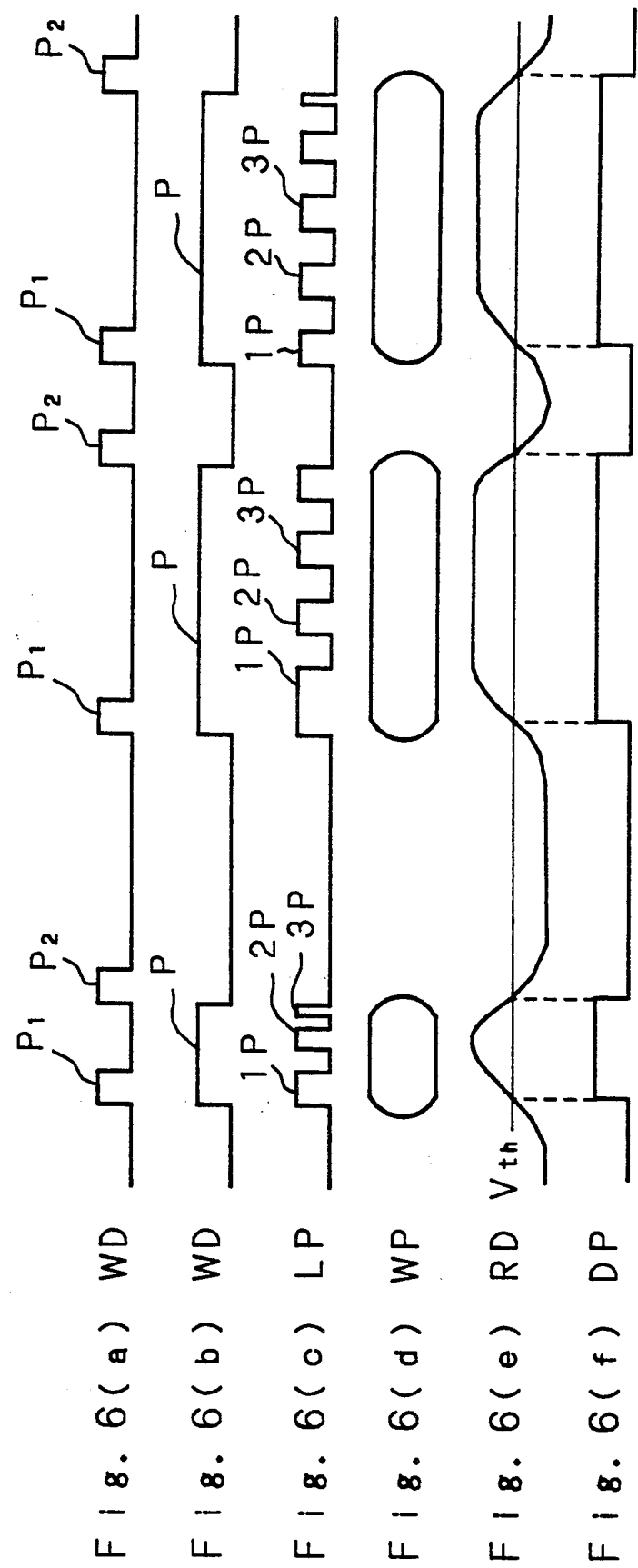

OPTICAL DISK APPARATUS FOR SHAPING PITS RECORDED ON AN OPTICAL DISK

BACKGROUND OF THE INVENTION

1. Field of the Invention

The present invention relates to an optical disk apparatus for recording information on an optical disk by projecting a light beam onto the optical disk.

2. Description of the Related Art

For high density recording of information on an optical disk, the pit-edge recording method is known in which information "1" is recorded at both the leading edge and trailing edge of one recording pit, as contrasted with the conventional pit-position recording method in which information "1" is recorded in one pit position.

FIG. 1 is a diagram explaining the information recording and regeneration signals and the states recording pits. The data word of information to be recorded is converted, for example, by "2/7" coding, into recording data WD (RZ modulation) as shown in FIG. 1(a) in the case of the pit-position recording method, and into recording data WD (NRZI modulation) as shown in FIG. 1(b) in the case of the pit-edge recording method, to record the information on an optical disk. In the recording of information "1", the information "1" is recorded during one pulse period in the case of FIG. 1(a). On the other hand, in the case of FIG. 1(b), the information "1" is recorded at both the leading edge and trailing edge of a recording pulse. In other words, in the case of FIG. 1(a), a single "1" can be recorded with one pulse, while in the case of FIG. 1(b), two "1"s can be recorded with one pulse.

In the pit edge recording, a laser diode is driven by a laser driving signal LP having the same pulse width as that of the pulse of the recording data WD shown in FIG. 1(b), and the light beam emitted from thus driven laser diode is projected onto the optical disk. The area of the optical disk illuminated by the light beam is heated. The area in the recording layer which exceeds the Curie temperature by heating is to be magnetized in the direction of an externally applied magnetic field, thereby forming a recording pit WP whose length corresponds to that of the laser drive signal LP, as shown in FIG. 1(d). However, immediately after the start of illuminating the light beam, the temperature of the optical disk surface near the leading edge of the pit is lower, so that the area that exceeds the Curie temperature is restricted; therefore, the pit width W of the recording pit is narrower immediately after the start of illuminating the light beam. Thereafter, as the heat of preceding light beam is accumulated and thus the temperature of the optical disk surface rises, the pit width W increases, thus forming the recording pit in a teardrop shape.

On the other hand, when regenerating the recorded information, a light beam is projected onto the optical disk, and the light reflected from the optical disk is detected to obtain a regeneration signal RD as shown in FIG. 1(e). The regeneration signal RD is then compared with a present threshold level Vth to obtain a pit detection signal DP as shown in FIG. 1(f). The pit detection signal DP is used to regenerate the recorded information. However, if the recorded pit WP is of a teardrop shape, the level of the regeneration signal RD at the leading edge of the recorded pit, i.e. the narrower portion is low, and the regeneration level gradually increases as the pit width increases as shown in FIG. 1(e). As a result, the period that exceeds the threshold level Vth becomes narrower than the pulse width of the recording data DW. In other words, the pulse width of the pit detection pulse DP shown in FIG. 1(f) is significantly shorter as compared with the pulse width of the recording data WD shown in FIG. 1(a) or (b) corresponding to information "1". This prevents accurate recording and regeneration of the information.

An information recording method aiming to overcome the above problem is published in Proc. Int. Symp. on Optical Memory, 1987 Japanese Journal of Applied Physics, Vol. 26 (1987) Supplement 26-4. FIG. 2 is a timing chart of recording and regeneration signals and recording pits according to that method. The recording data WD shown in FIG. 2(a) and (b) have the same patterns as the recording data WD shown in FIG. 1(a) and (b), respectively. As shown in FIG. 2(c), a correction prior to recording is made to the laser driving signal LP in such a manner that the pulse level thereof is significantly increased for a prescribed period from the leading edge of the pulse thereby increasing the power of the laser. As a result, the temperature of the optical disk surface quickly rises immediately after the start of illuminating the light beam, allowing the recording pit WP to be formed in an oval shape, as shown in FIG. 2(d), having a wide pit width W from the leading edge. Therefore, when regenerating the recorded information, the regeneration signal RD shown in FIG. 2(e) is obtained from the light reflected from the optical disk, which sharply rises. Consequently, the period during which the regeneration signal RD exceeds the threshold level Vth becomes longer than in the case of the teardrop-shaped recording pit shown in FIG. 1(d), so that the pit detection pulse DP has a wider pulse width as shown in FIG. 2(f). The pulse width of the pit detection pulse DP is approximately equal to the pulse width of the recording data WD shown in FIG. 2(a) or (b), thus ensuring accurate regeneration of the information recorded on the optical disk.

However, in order to raise the laser diode power by increasing the level of the laser driving signal LP for a prescribed period on the leading edge side, as described above, it requires the use of a laser diode having a high power, the resulting problem being that the reliability of the optical disk apparatus is impaired and life of the apparatus is reduced.

SUMMARY OF THE INVENTION

The present invention has been devised to overcome the above enumerated problems, and it is a primary object of the invention to provide an optical disk apparatus in which the timing to start or end the light beam projection on an optical disk or the number of emissions and the duration of each emission of the light beam is controlled according to the pulse pattern of the information to be recorded, thereby correcting the recording pit pattern on the optical disk using the existing light source power so as to ensure accurate regeneration of the recorded information.

The above and further objects and features of the invention will more fully be apparent from the following detailed description with accompanying drawings.

BRIEF DESCRIPTION OF THE DRAWINGS

FIG. 1(a-f) and FIG. 2(a-f) are timing charts for recording and regeneration signals of information and recording pits in accordance with a conventional optical disk apparatus;

FIG. 4(a-f) is a timing chart for recording and regeneration signals of information and recording pits according to the optical disk of the invention;

FIG. 5(a-f) is a timing chart for recording and regeneration signals of information and recording pits according to another embodiment of the optical disk apparatus of the invention; and FIG. 6(a-f) is a timing chart for recording and regeneration signals of information and recording pits according to still another embodiment of the optical disk apparatus of the invention.

DESCRIPTION OF THE PREFERRED EMBODIMENTS

Figure 3:
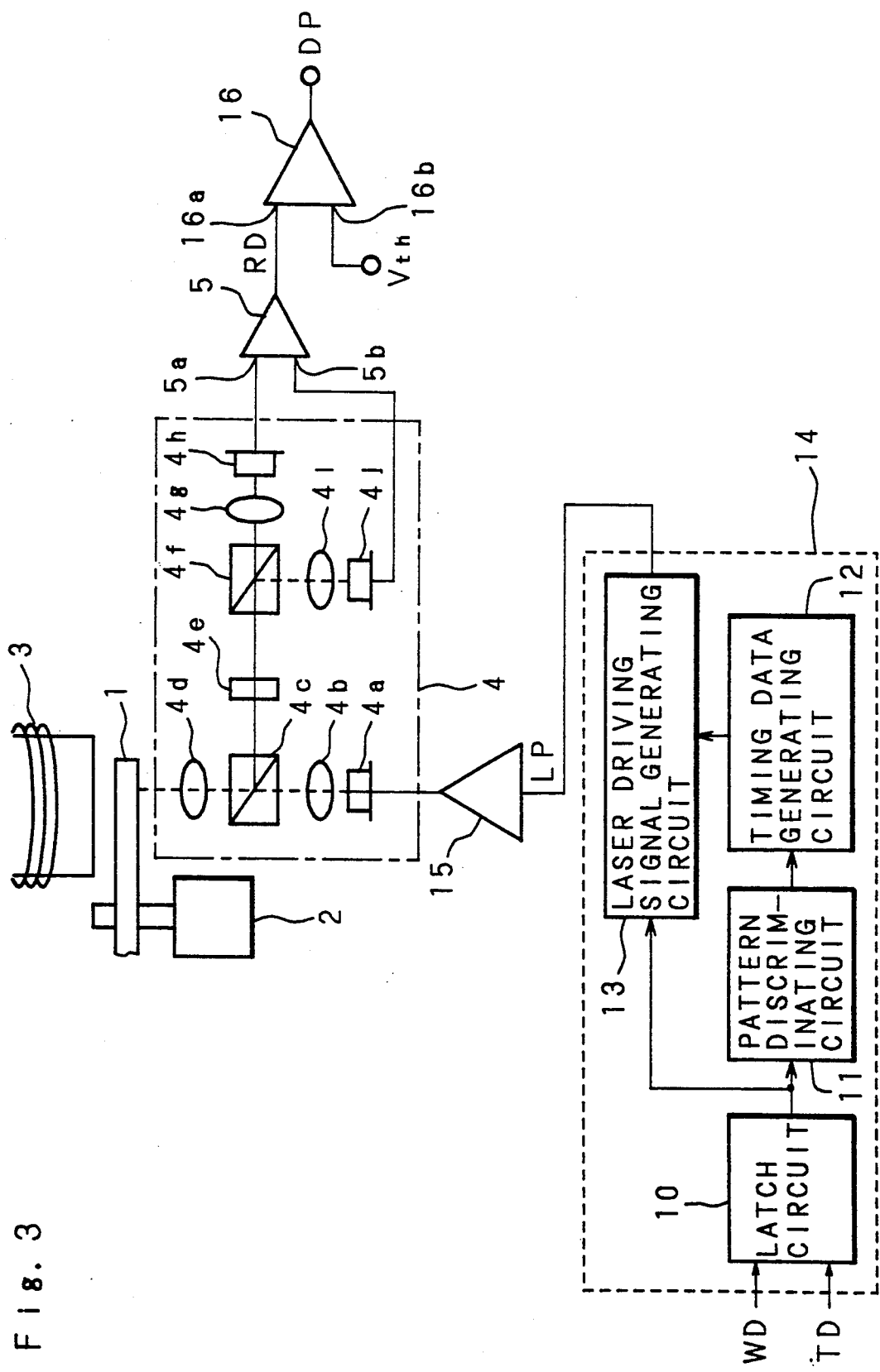
FIG. 3 is a block diagram of the essential parts of an optical disk apparatus according to the invention.

The preferred embodiments of the invention will now be described with reference to the accompanying drawings.

FIG. 3 is a block diagram of the essential parts of an optical disk apparatus according to the invention. There are provided a latch circuit 10, a pattern discriminating circuit 11, a timing data generating unit 12, and a laser driving signal generating circuit 13, which together constitute a laser driving circuit 14.

The latch circuit 10 is supplied with recording data WD of information and a latch timing signal TD, the recording data WD being latched by the latch circuit 10 in synchronism with the timing signal TD. The data latched by the latch circuit 10 is fed to the pattern discriminating circuit 11 as well as to the laser driving signal generating circuit 13, and the pattern discriminating circuit 11 discriminates the pattern of the recording data WD. The output of the pattern discriminating circuit 11 is supplied to the timing data generating unit 12. The timing data generating unit 12 previously stores timing data corresponding to various patterns of recording data WD and produces the timing data corresponding to the pattern of the recording data WD from the pattern discriminating circuit 11 to supply the timing data the laser driving signal generating circuit 13. The laser driving signal generating circuit 13 generates a laser driving signal obtained by modifying the leading edge of the pulse of the supplied recording data WD in accordance with the timing data given from the timing data generating unit 12. The laser driving signal is fed to a laser control circuit 15.

The laser control circuit 15 controls a laser diode 4a to adjust the light power of the laser diode 4a to the level suitable for recording or regeneration of information.

A magneto-optical disk 1 is rotated by a spindle motor 2. On one side of the magneto-optical disk 1, there is disposed an electromagnet 3 as a magnetic head for applying a magnetic field to the magneto-optical disk 1, while an optical head 4 is disposed on the other side of the magneto-optical disk 1. Light emitted from the laser diode 4a in the optical head 4 passes through a collimator lens 4b, a beam splitter 4c and a lens 4d, and is projected onto the magneto-optical disk 1. Light reflected by the beam splitter 4c passes through a λ/4 plate 4e, a polarizing beam splitter 4f and a first converging lens 4g, and enters a first photo-detector 4h. Light reflected by the polarizing beam splitter 4f passes through a second converging lens 4i and enters a second photo-detector 4j. The outputs of the first and second photo-detectors 4h and 4j are respectively supplied to the two input terminals 5a and 5b of a preamplifier 5. The output signal from the preamplifier 5 is fed to one input terminal 16a of a comparator 16, while a threshold voltage Vth is given to the other terminal 16b of the comparator 16. As a result, the comparator 16 outputs a pit detection signal.

The operation of the thus constructed magneto-optical disk apparatus will now be described with reference to the timing chart of FIG. 4 for recording and regeneration signals of information and recording pits.

To record information on the magneto-optical disk 1, the electromagnet 3 is energized to apply a magnetic field to the magneto-optical disk 1 which is rotated by the spindle motor 2, and light emitted from the laser diode 4a is projected onto the rotating magneto-optical disk 1 thereby to record information thereon.

The data word of information to be recorded is converted, for example, by "2/7" coding, into recording data (RZ modulation) as shown in FIG. 4(a) in the case of pit position recording, and into recording data (NRZI modulation) as shown in FIG. 4(b) in the case of pit edge recording. The information is recorded using one or other of the recording data.

In the recording of information "1", the information "1" is recorded during one pulse period in the case of FIG. 4(a). On the other hand, in the case of FIG. 4(b), the information "1" is recorded at both the leading edge and trailing edge of a recording pulse. In other words, in the case of FIG. 4(a), a single "1" is recorded with one pulse, while in the case of FIG. 4(b), two "1"s are recorded with one pulse.

For example, when the recording data WD shown in FIG. 4(b) and the timing data TD are given to the latch circuit 10 in the laser driving circuit 14, the latch circuit 10 latches the recording data WD in synchronism with the timing data TD and supplies the parallel/serial converted recording data WD to the pattern discriminating circuit 11 and the laser driving signal generating circuit 13. The pattern discriminating circuit 11 discriminates the waveform pattern of the recording data WD given from the latch circuit 10 and supplies the discrimination data to the timing data generating unit 12. In response, the timing data generating unit 12 outputs the timing data corresponding to the discriminated pattern to the laser driving signal generating circuit 13.

Based on the timing data from the timing data generating unit 12, the laser driving signal generating circuit 13 generates a pulse LP1 of a laser driving signal LP as shown in FIG. 4(c), with the leading edge in advance of that of the first pulse P of the recording data WD of FIG. 4(b) supplied from the latch circuit 10. The leading edge of the pulse LP1 thus precedes the leading edge of the first pulse P of the recording data WD by Δt0. Likewise, the leading edge of the second pulse LP2 of the laser driving signal LP precedes the leading edge of the second pulse P of the recording data WD by Δt1. On the other hand, the leading edge of the third pulse LP3 is delayed from the leading edge of the third pulse P of the recording data WD by Δt2. In other words, when the pulses Ps of the recording data WD are generated repetitively at short intervals, the pit pattern formed by the succeeding pulse P becomes larger as it is affected by the heat of the preceding pulse. Therefore, the leading edge of the succeeding pulse of the laser driving signal LP is delayed from the leading edge of the corresponding pulse P to form the pit pattern in a proper shape.

Thus generated laser driving pulse LP is supplied to the laser control circuit 15 which controls the laser diode 4a in accordance with the laser driving signal LP to obtain the light power for recording information. The laser beam emitted from the laser diode 4a passes through the collimator lens 4b, the beam splitter 4c, and the lens 4d, and is projected onto the magneto-optical disk 1. As a result, the illuminated area of the magneto-optical disk 1 is heated by the laser beam up to the Curie temperature to be magnetized in the direction of an externally applied magnetic field, thus forming the recording pit shown in FIG. 4(d). Since the leading edge of each of the pulses LP1, LP2, LP3 of the laser driving signal LP is modified in accordance with the pattern of the preceding recording data WD, it ensures that each area of the magneto-optical disk 1 corresponding to the leading edge of the pulse P of the recording data WD is heated up to approximately the same temperature.

When forming a succeeding pit after a short time interval, the effect of heat from the preceding pit serves to accelerate the formation of the succeeding pit. As a result, the width of the pulse DP of detecting the pit will become wider than the pulse width of the recording data WD. Therefore, in this embodiment, when the pulses Ps of the recording data WD are generated repetitively at short intervals, the leading edge of each succeeding pulse LP is delayed from that of the corresponding pulse P. The delay time is optimized with reference to the preceding pattern of the recording data WD. On the other hand, when there is no effect of heat from the preceding pulse LP, a teardrop-shaped pit is formed, as previously noted, in which case the width of the pulse DP of detecting the pit will become narrower than the pulse width of the recording data WD. Therefore, a correction is made before recording to the pulse width which is expected to be reduced, so that the laser driving signal LP is generated with its leading edge in advance of that of the recording data WD, in order to form the recording pit WP.

When regenerating thus recorded information, the laser control circuit 15 controls the laser diode 4a to emit a light beam with power suitable for regeneration of information. The light emitted from the laser diode 4a passes through the collimator lens 4b, the beam splitter 4c and the lens 4d, and is projected onto the rotating magneto-optical disk 1. The light reflected from the magneto-optical disk 1 passes through the lens 4d and is reflected by the beam splitter 4c. The reflected light then passes through the λ/4 plate 4e, reflected by the polarizing beam splitter 4f, and enters the first photo-detector 4h through the converging lens 4g. On the other hand, the light reflected by the polarizing beam splitter 4f passes through the converging lens 4i and enters the second photo-detector 4j. Each of the photo-detectors 4h and 4j outputs an analog signal corresponding to the incident illumination by photoelectric transfer, and the analog signal is amplified by the preamplifier 5 to obtain a regeneration signal RD shown in FIG. 4(e). The regeneration signal RD is compared with the threshold voltage Vth by the comparator 16. When the regeneration signal RD exceeds the threshold voltage, the comparator 16 outputs a pit detection signal DP, shown in FIG. 4(f), whose pulse width is approximately equal to that of the pulse D of the recording data WD, thus enabling accurate regeneration of the recorded information. Therefore, information can be accurately recorded on the magneto-optical disk without temporarily increasing the power of the laser diode 4a during the recording of information.

In the above embodiment, the leading edge of each of the pulses LP1, LP2, LP3 of the laser driving signal LP is modified relating to the pattern of the preceding recording data WD, but alternatively, when the trailing edge of each of the pulses LP1, LP2, LP3 of the laser driving signal LP may be modified relating to the pattern of the succeeding recording data WD, as shown in FIG. 5, each area of the magneto-optical disk 1 corresponding to the leading edge of the pulse P of the recording data WD can be heated up to approximately the same temperature.

The same recording process can also be applied to the RZ modulation recording data WD shown in FIG. 4(a).

FIG. 6 is a timing chart for recording and regeneration signals of information and recording pits according to another embodiment of the optical disk of the invention. As shown in FIG. 6(c), in this embodiment, the pulse of the laser driving signal LP during the recording period of information "1" is subdivided into a group of pulses of different widths, the first pulse in the pulse group having a different width from the other pulses in the group corresponding to the pattern of the recording data WD. The second and subsequent pulses 2P, 3P in each pulse group are provided with gradually diminishing widths or with the same widths. The pulse number data and timing data of various pulse groups for the laser driving signal LP are stored in the timing data generating unit 12 shown in FIG. 3, and the pulse number data and timing data corresponding to the pattern of the recording data WD are supplied to the driving signal generating circuit 13 to obtain the laser driving signal LP as shown in FIG. 6(c).

When the laser diode 4a is driven using the above laser driving signal LP, the temperature of the surface of the magneto-optical disk 1 illuminated by a light beam quickly rises upon the illumination, but the subsequent heating up of the disk surface is suppressed. This serves to reduce the effect of heat from the preceding recording pit WP when the recording pits WP are formed in close proximity to each other. As a result, each recording pit WP is formed in an oval shape as shown in FIG. 6(d), the width being maintained approximately the same across the length in the longitudinal direction thereof.

Also, when regenerating the recorded information, a pit detection signal DP is obtained which has approximately the same width as that of the pulse of the recording data WP, as shown in FIG. 6(f), thus permitting accurate regeneration of the recorded information.

In the above embodiment, recording and regeneration of information to/from a magneto-optical disk has been described, but it will be appreciated that the same effects as stated herein can also be obtained when the invention is applied to an optical disk apparatus in which information is recorded to and regenerated from an optical disk without applying a magnetic field.

Also, in the above embodiment, the laser diode is driven by a laser driving signal corresponding to the pattern of information, but it will be appreciated that the same effects as stated herein can be obtained when a shutter capable of blocking the laser diode light to be projected onto the optical disk is provided and the shutter is driven by a control signal similar to the laser driving signal.

Further, light to be projected onto an optical or magneto-optical disk is not restricted to a laser light.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An apparatus for recording on an optical disk information defined by an input pulse pattern comprising:
   a light source for heating the optical disk by a light beam for recording information thereon;
   a pulse pattern discriminating circuit for discriminating the input pulse pattern and providing an output indicative of an amount of time between the end of a first pulse in the input pulse pattern and the beginning of an immediately subsequent second pulse, the duration of the first pulse and the duration of the second pulse;
   a timing data generating unit, responsive to the output of the pulse pattern discriminating circuit, for generating timing data to be used for modifying the duration of the second pulse; and
   a control circuit, responsive to the input pulse pattern and the timing data, for modifying the duration of the second pulse and for controlling the light source to emit the light beam to the optical disk on the basis of the modified second pulse so that the information recorded on the optical disk, when read, results in a pulse pattern corresponding to the input pulse pattern.

2. The apparatus as set forth in claim 1, wherein the timing data generating unit generates timing data to be used for modifying the start time of the second pulse.

3. The apparatus as set forth in claim 2, wherein the timing data generating unit generates timing data to be used for modifying the end time of the second pulse.

4. An optical disk apparatus as set forth in claim 1, further comprising:
   a shutter for blocking the beam to be projected from the light source to the optical disk,
   whereby the control circuit controls the activation and deactivation of the shutter in accordance with the timing data.

5. The apparatus as set forth in claim 2, wherein the timing data generating unit generates timing data to be used for modifying the end time of the second pulse.

6. An apparatus for recording on an optical disk information defined by an input pulse pattern, comprising:
   a light source for heating the optical disk by emitting a light beam for recording information thereon;
   a pulse pattern discriminating circuit for discriminating the input pulse pattern and providing an output indicative of an amount of time between the end of a first pulse in the input pulse pattern and the beginning of an immediately subsequent second pulse, the duration of said first pulse and the duration of the second pulse; and
   a timing data generating unit, responsive to the output of the pulse pattern discriminating circuit, for generating timing data indicative of a number of emissions from the light source and a duration for each emission during the second pulse;
   a control circuit responsive to the input pulse pattern and the timing data for controlling the light source to emit the light beam intermittently to the optical disk in accordance with the timing data so that the information recorded on the optical disk, when read, results in a pulse pattern corresponding to the input pulse pattern.

7. An optical disk apparatus as set forth in claim 6, further comprising:
   a shutter for blocking the beam to be projected from the light source to the optical disk,
   whereby the control circuit controls the activation and deactivation of the shutter in accordance with the timing data.

8. A method for controlling a light source of an optical disk apparatus for recording on an optical disk information defined by an input pulse pattern, the method comprising the steps of:
   determining an amount of time between the end of a first pulse in the input pulse pattern and the beginning of an immediately subsequent second pulse;
   determining the duration of the first pulse;
   determining the duration of the second pulse;
   generating timing data on the basis of the determined durations of the first and second pulses and the amount of time between the end of the first pulse and the beginning of the second pulse, the timing data to be used for modifying the duration of the second pulse; and
   controlling the light source in response to the input pulse pattern and the timing data to emit the light beam to the optical disk by modifying the duration of the second pulse in the input pulse pattern so that the information recorded on the optical disk, when read, results in a pulse pattern which corresponds to the input pulse pattern.

9. The method of claim 8 wherein the step of controlling the light source includes modifying the start time of the second pulse.

10. The method of claim 8 wherein the step of controlling the light source includes modifying the end time of the second pulse.

11. The method of claim 9 wherein the step of controlling the light source includes modifying the end time of the second pulse.

12. A method for controlling a light source of an optical disk apparatus for recording on an optical disk information defined by an input pulse pattern, the method comprising the steps of:
   determining an amount of time between the end of a first pulse in the input pulse pattern and the beginning of an immediately subsequent second pulse;
   determining the duration of said first pulse;
   determining the duration of the second pulse;
   generating timing data on the basis of the determined durations of the first and second pulses and the amount of time between the end of the first pulse and the beginning of the second pulse, the timing data to be used for modifying the duration of the second pulse;
   generating timing data indicative of a number of emissions from the light source in a duration for each emission during the second pulse on the basis of the duration of the first and second pulses and the amount of time between the end of a first pulse and the beginning of the second pulse;
   controlling the light source to emit the light beam intermittently to the optical disk in accordance with the timing data so that the information recorded on the optical disk, when read, results in a pulse pattern which corresponds to the input pulse pattern.

* * * * *